May 8, 1956
G. R. LOUTHAN
2,744,374
RECIPROCATING CUTTING ASSEMBLY WITH
TRACTOR MOUNTABLE HITCH STRUCTURE
Filed Aug. 9, 1951
10 Sheets-Sheet 9
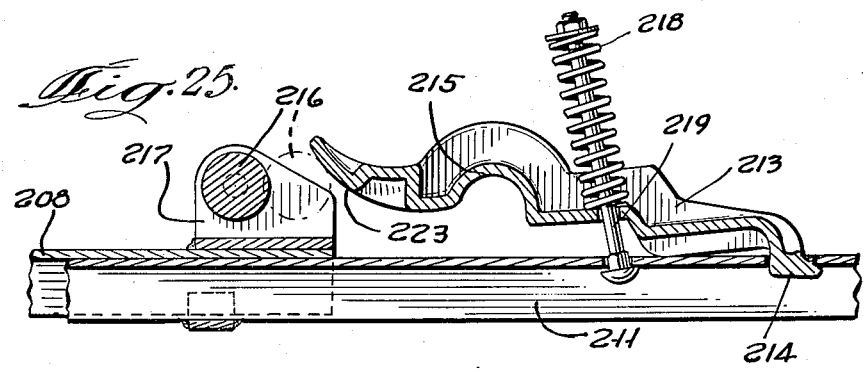
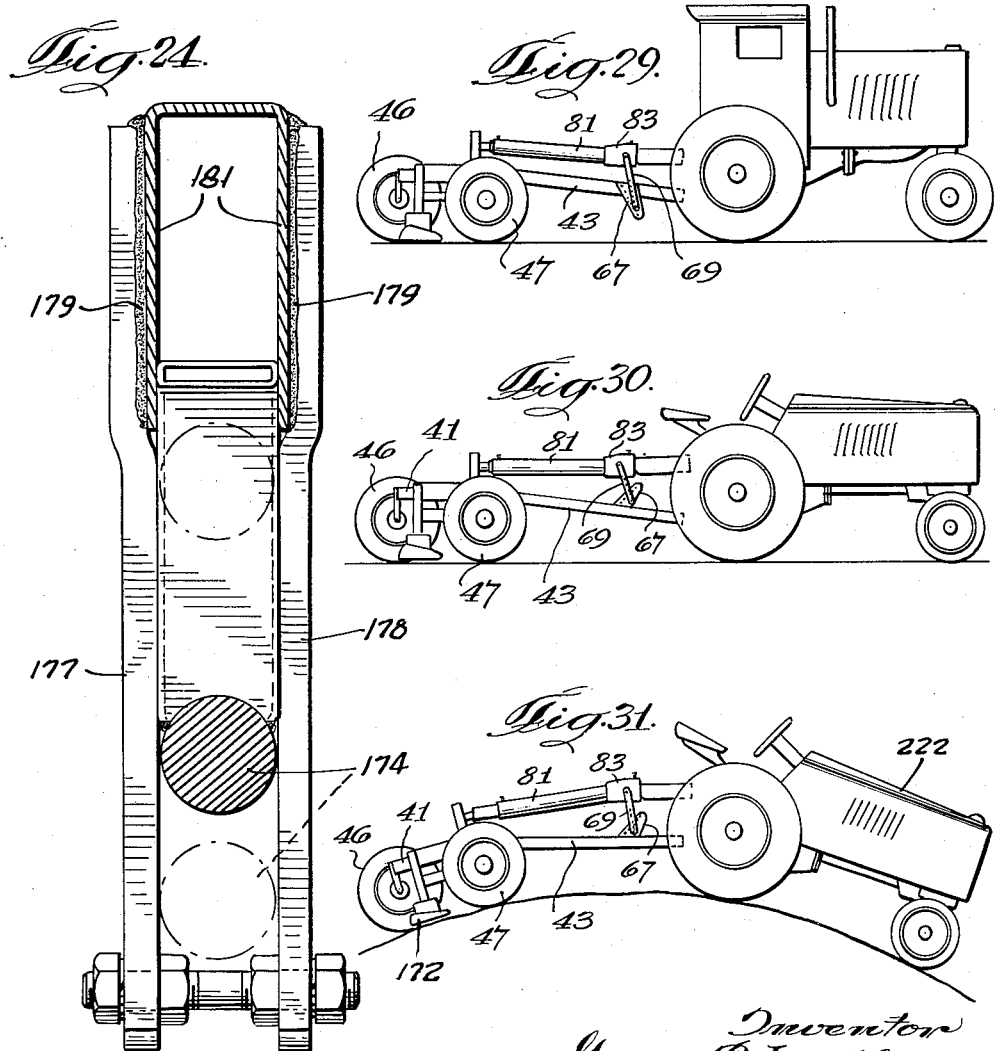

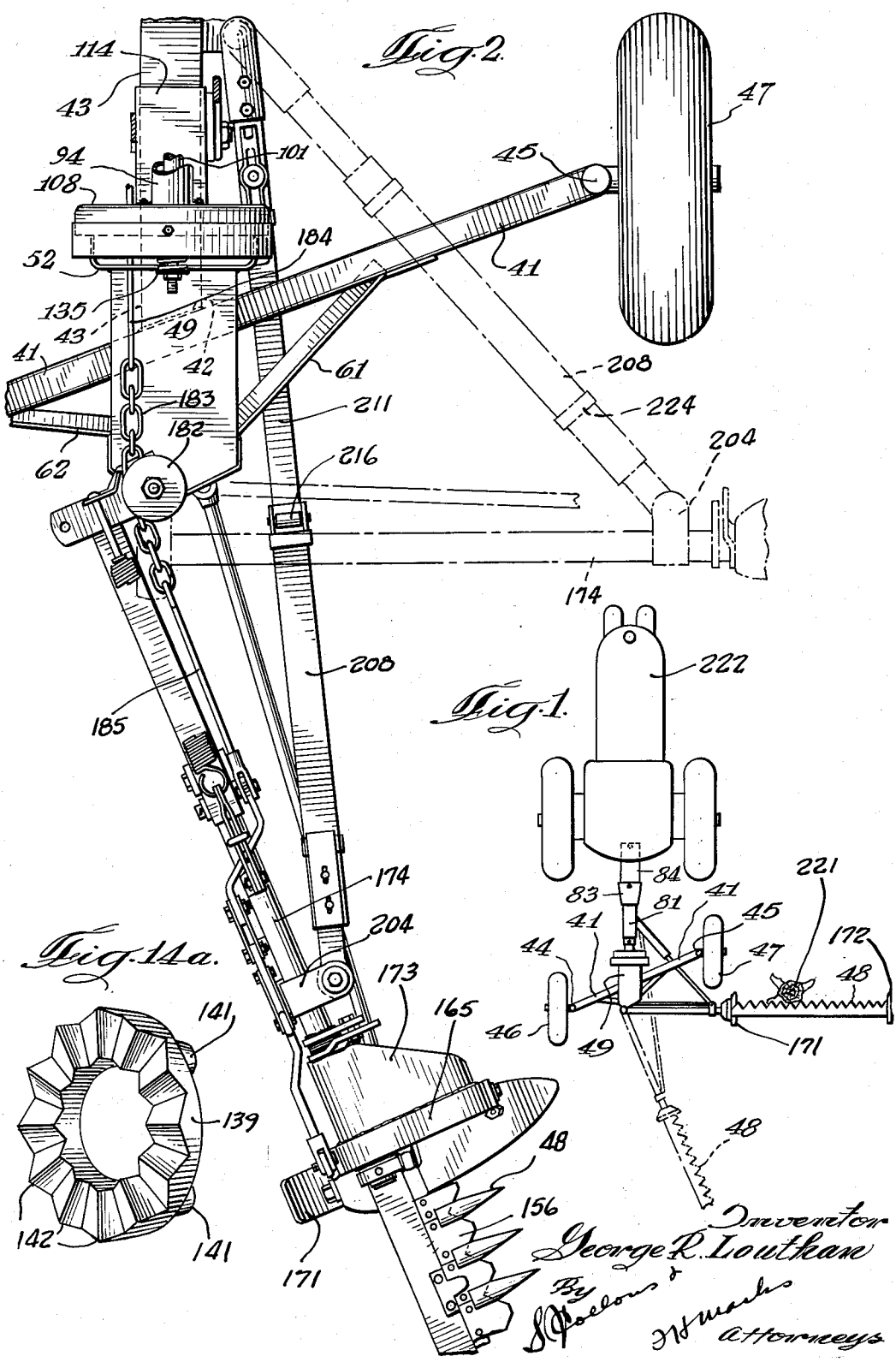

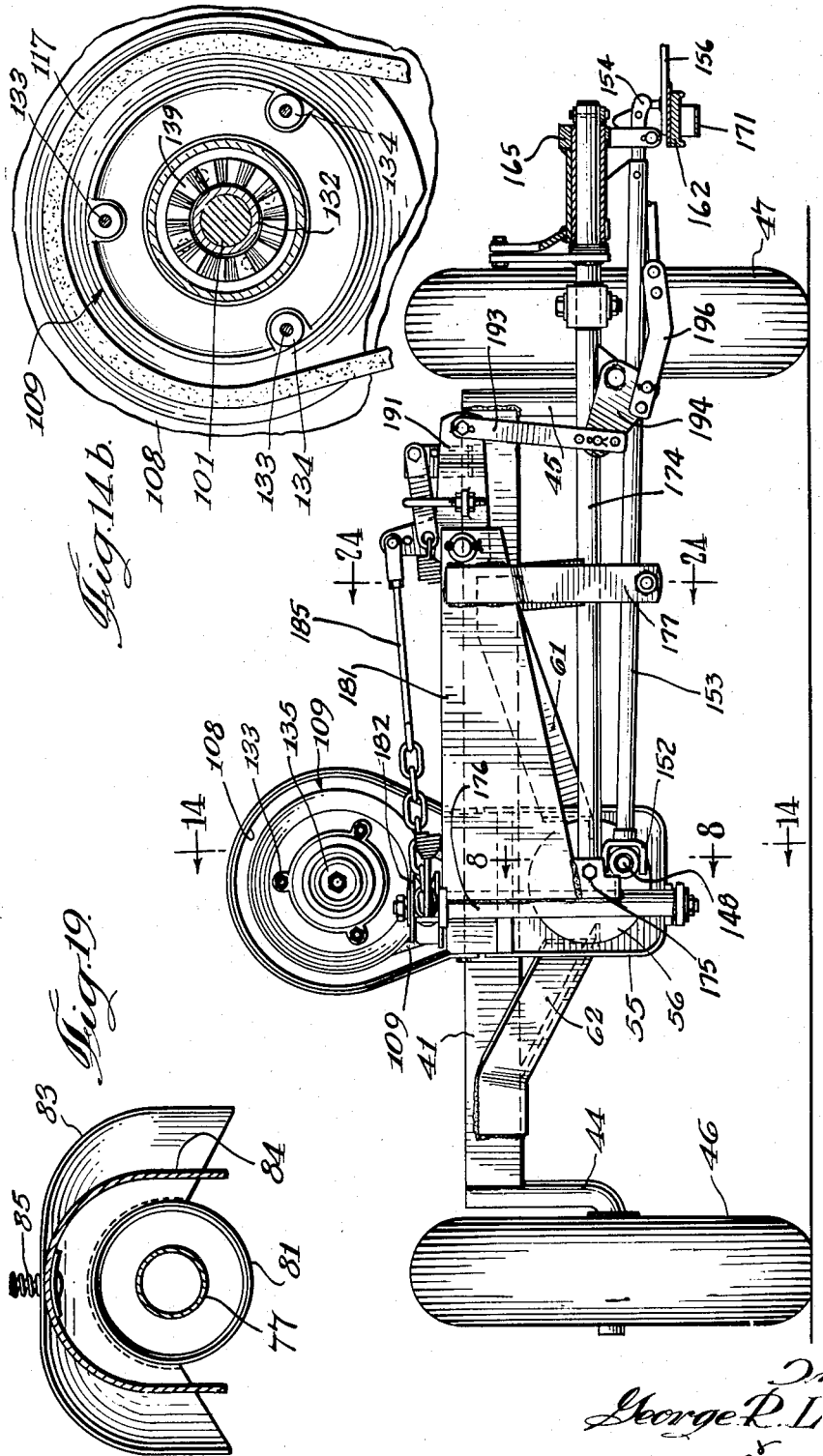

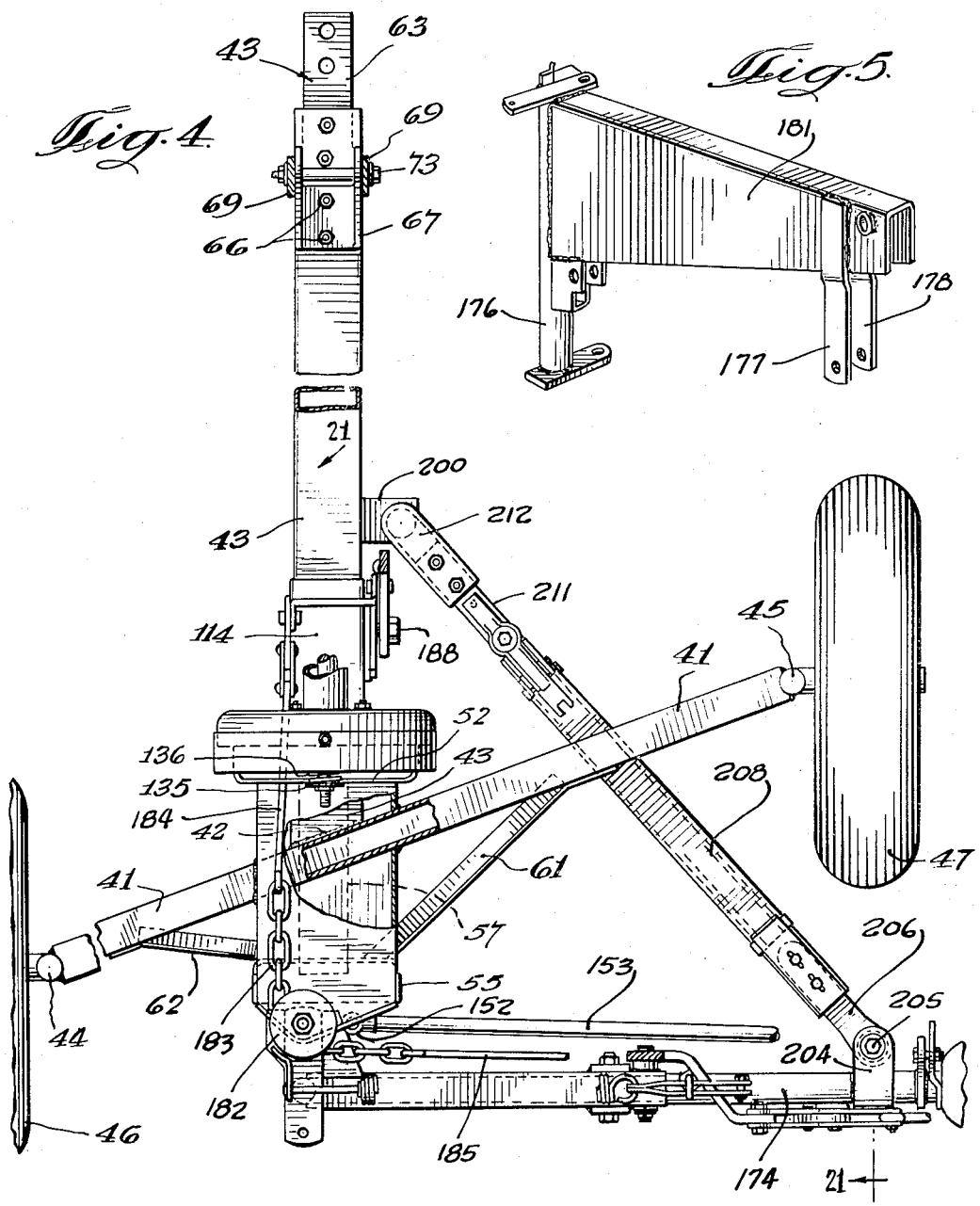

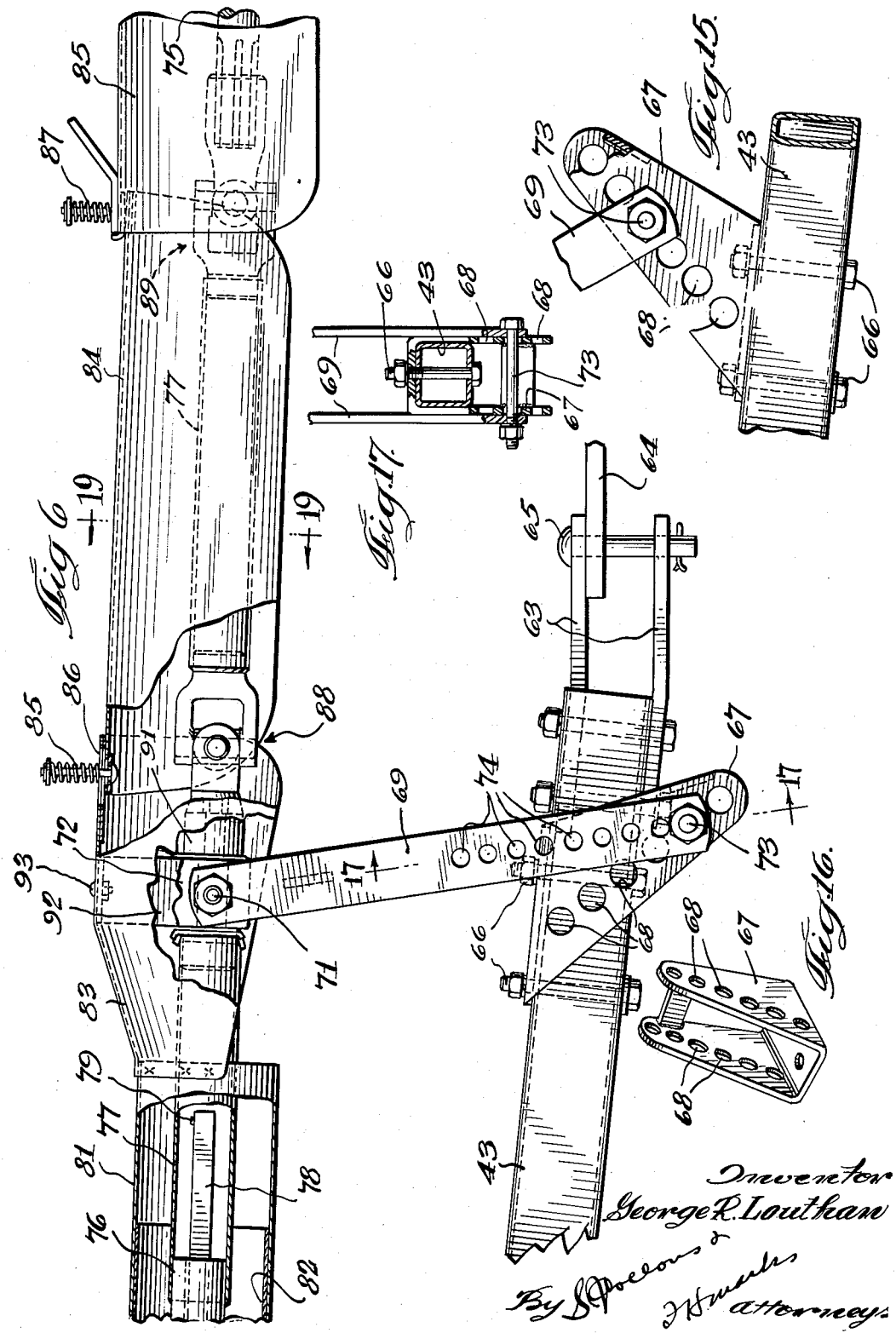

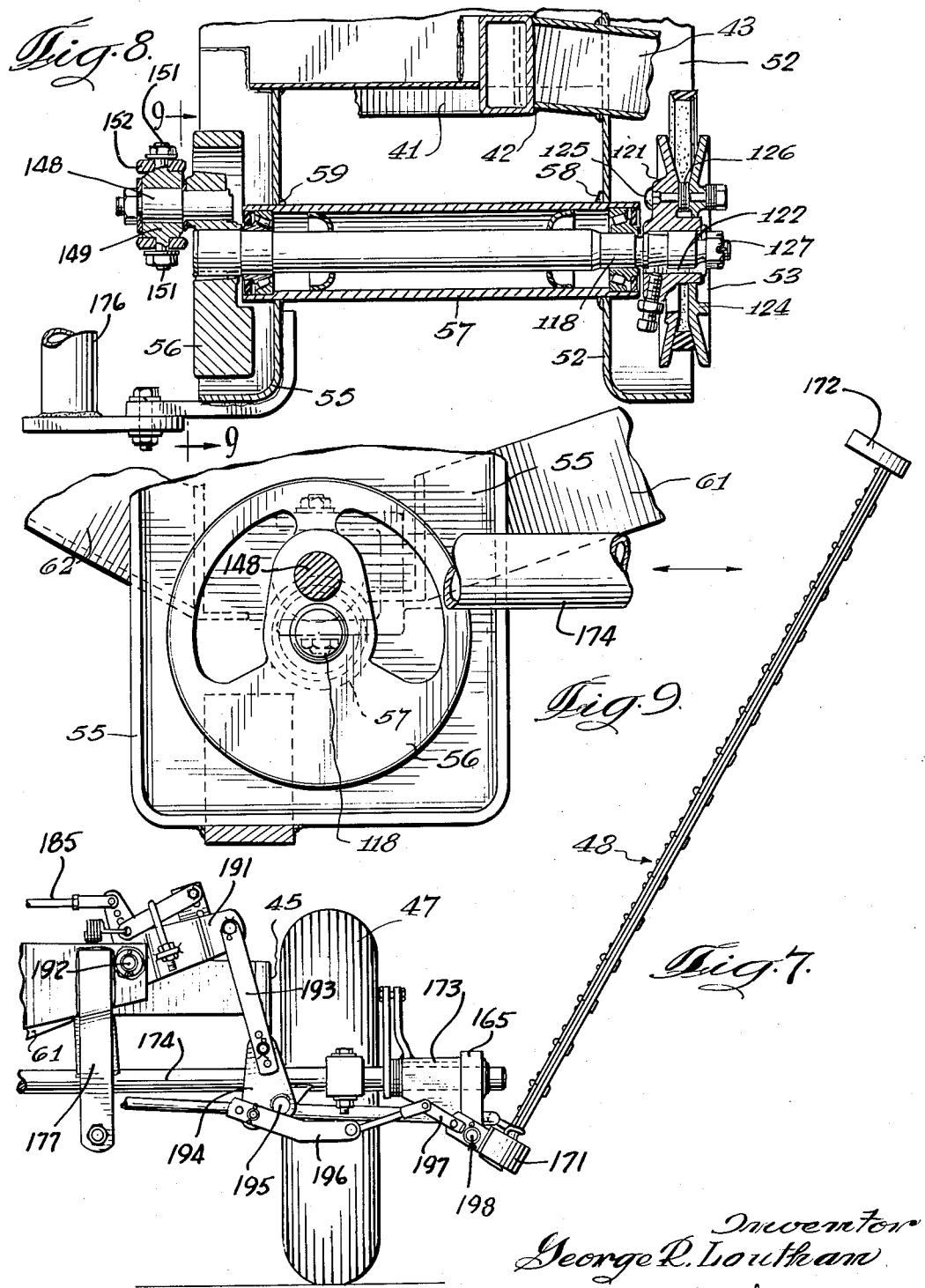

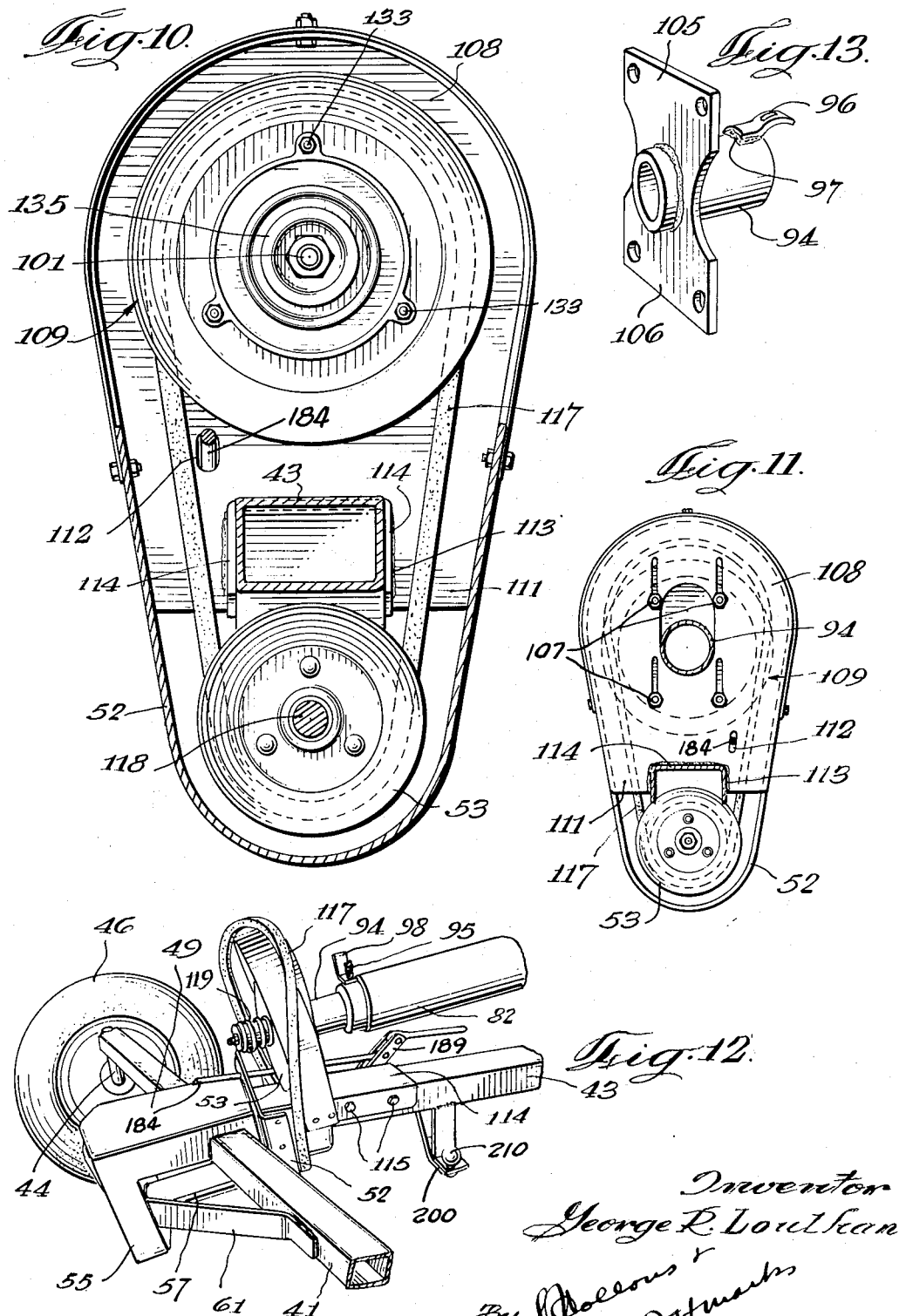

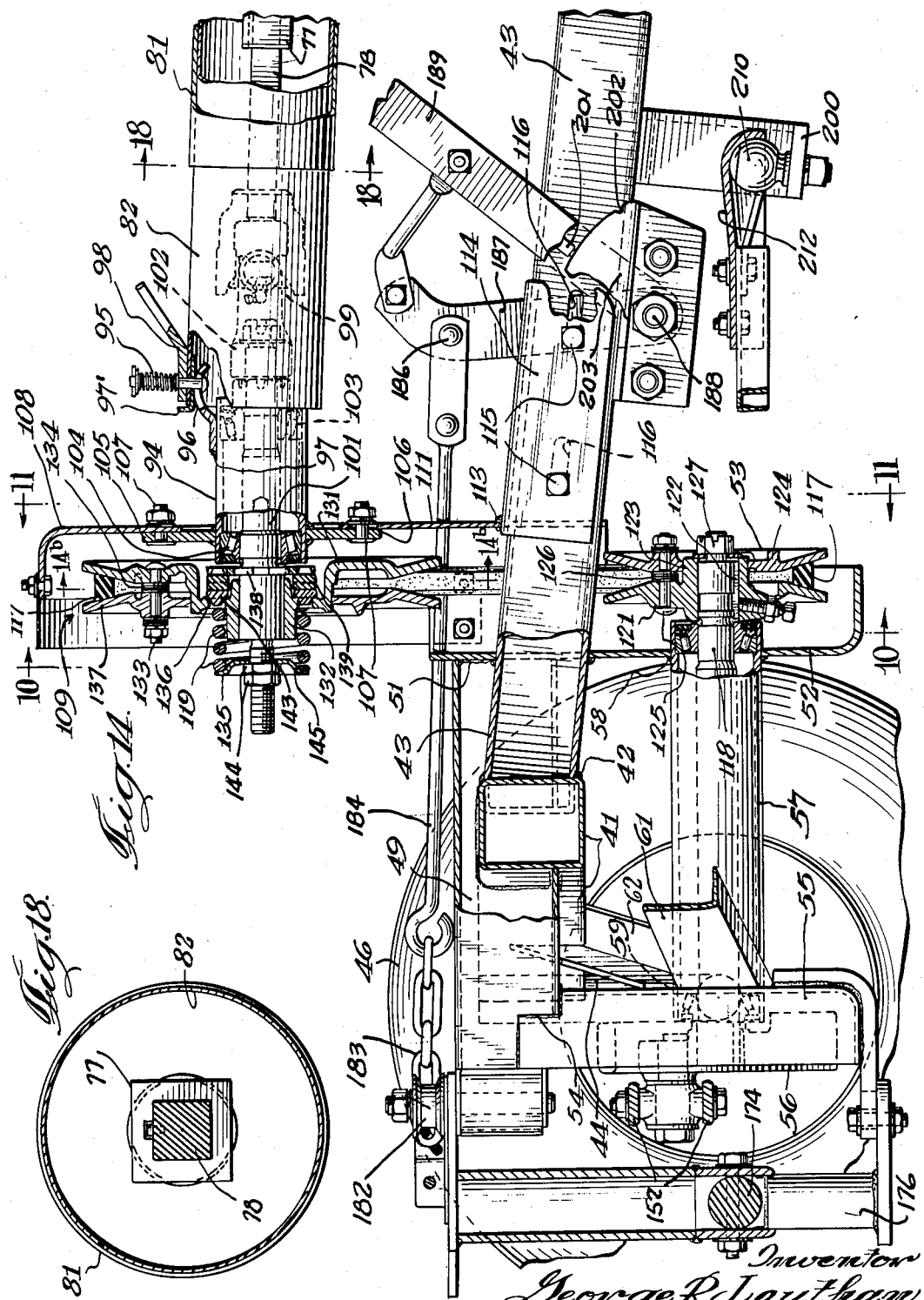

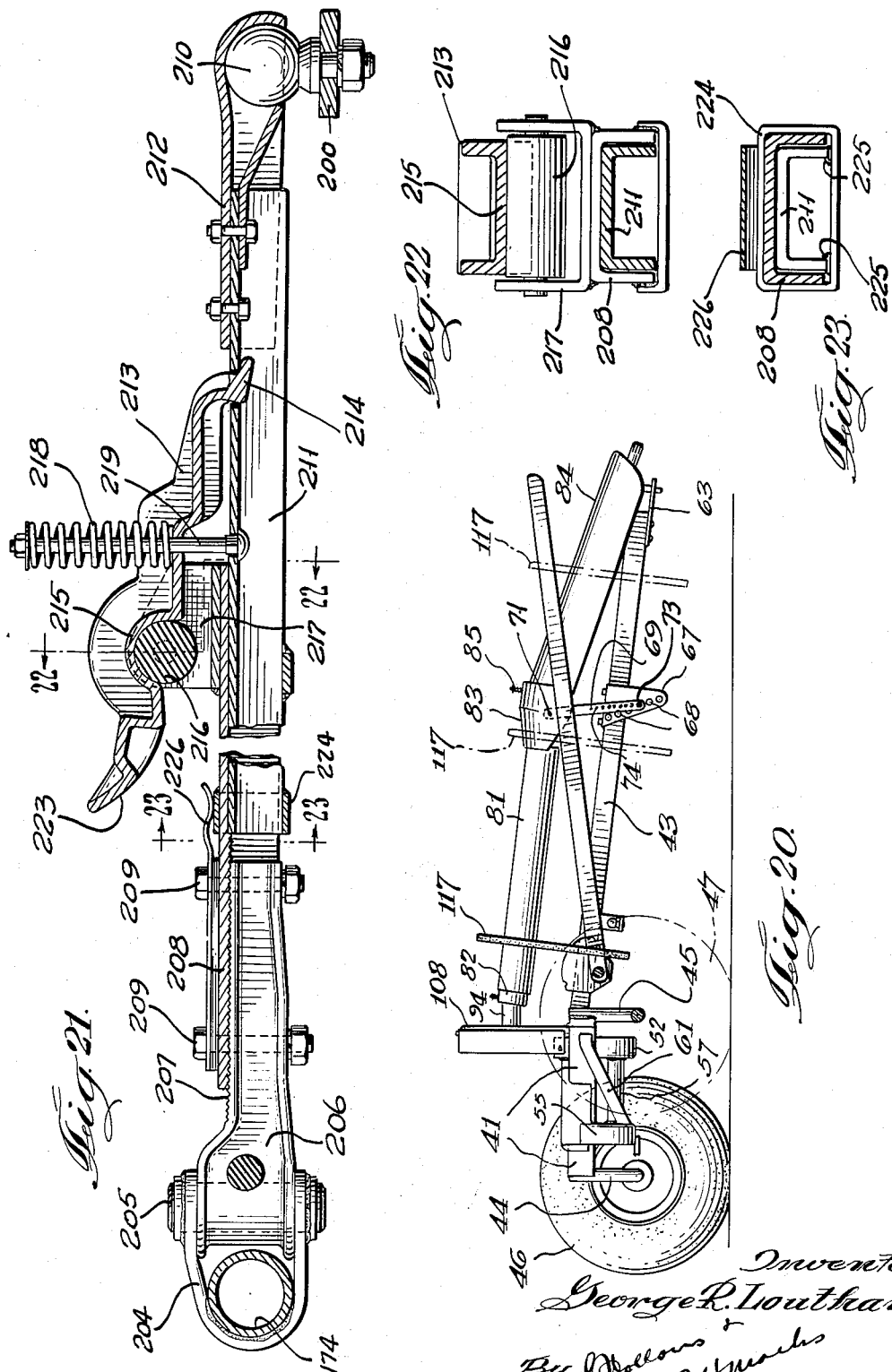

May 8, 1956  G. R. LOUTHAN  2,744,374
RECIPROCATING CUTTING ASSEMBLY WITH
TRACTOR MOUNTABLE HITCH STRUCTURE
Filed Aug. 9, 1951  10 Sheets-Sheet 10
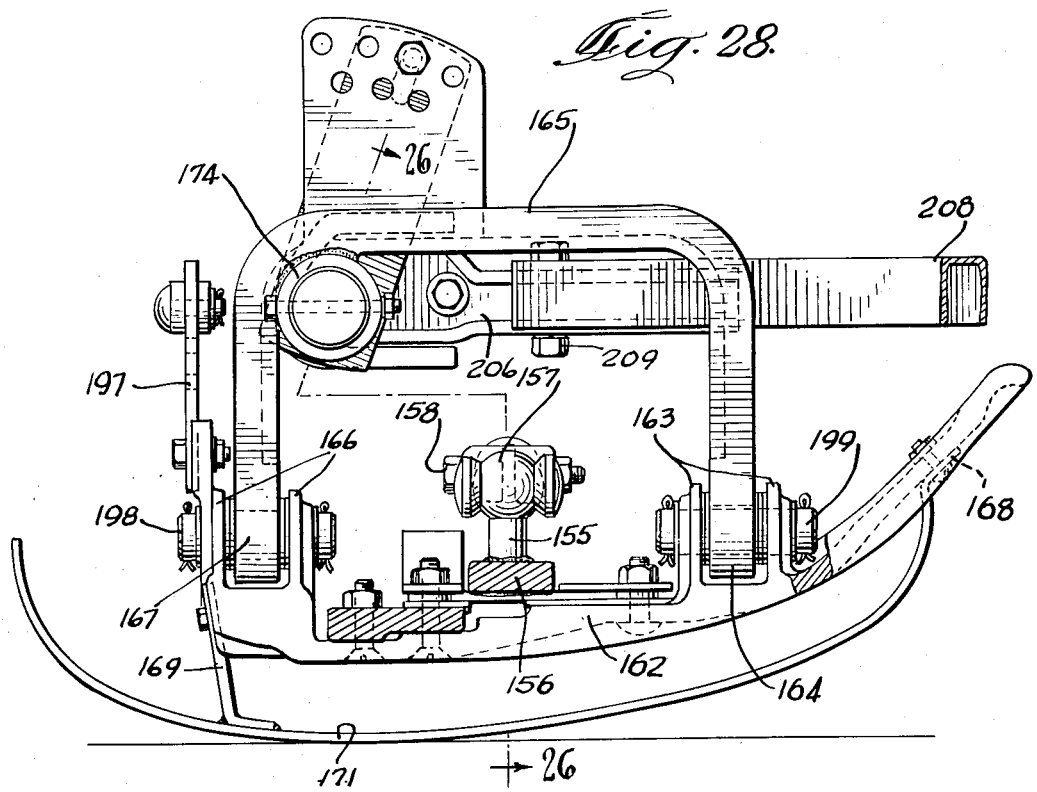
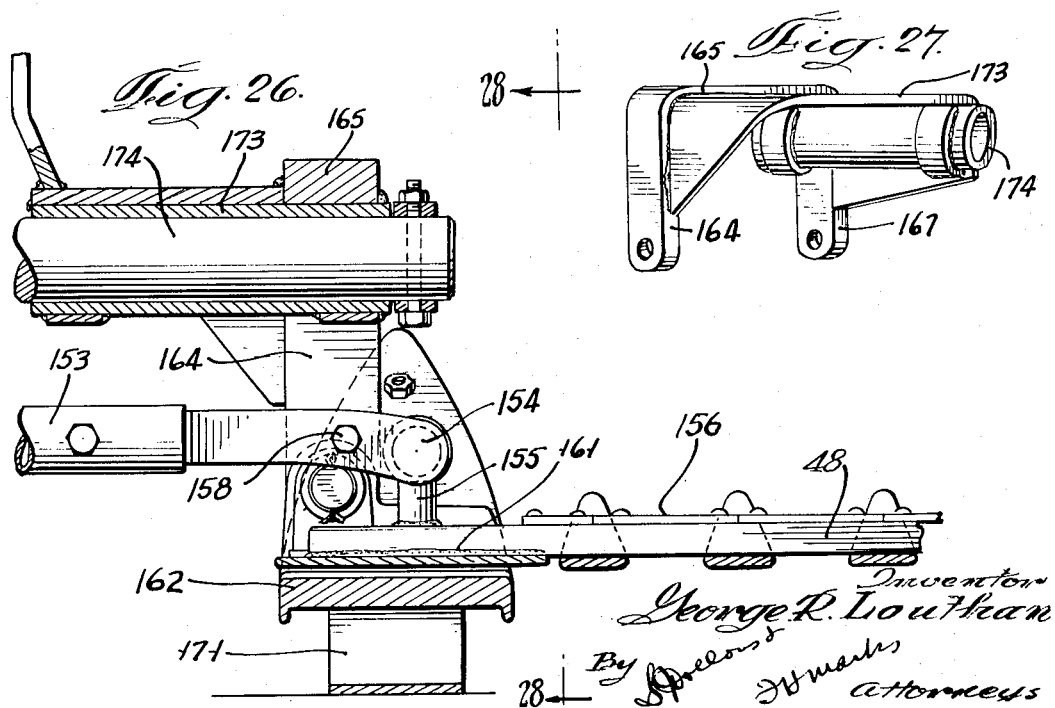

United States Patent Office 2,744,374
Patented May 8, 1956

2,744,374

RECIPROCATING CUTTING ASSEMBLY WITH TRACTOR MOUNTABLE HITCH STRUCTURE

George R. Louthan, Manteno, Ill., assignor to Sears, Roebuck and Co., Chicago, Ill., a corporation of New York Application August 9, 1951, Serial No. 241,143

2 Claims. (Cl. 56—25)

The present invention relates to farm type mowing machinery suitable for attachment to conventional tractors which are equipped with rearwardly extending horizontal power take-off connections.

Apparatus of the general class to which this invention pertains as designed and manufactured herefor has been found to be in several respects limited in versatility so as not to be easily adaptable to a wide variety of tractor vehicles such as are being manufactured and sold for use in the drayage and operation of various kinds of farm implements.

Further, tractor drawn mowers as heretofore designed and produced have been observed to require larger turning radii for a given set of over-all dimensions; or in some instances, the linear dimension for a given size of mower structure and capacity of cutting swath has been observed to exceed an ideal minimum range which permits of facile and convenient handling during field operation and of space saving during storage.

Intermediate the power transmission system, a frictionally yieldable belt driven pulley system is employed in order to produce an ideal condition of rotary speed for driving the mower system and at the same time afford yieldable slippage when overpowered by encounter with predetermined resistance. The pulley belts which are employed in these intermediate power transmission couplings are susceptible of wear so that accordingly at infrequent periodic intervals, they are required to be replaced. Dismantling the apparatus for achieving this replacement has in heretofore practiced mower structures involved a major degree of piece part disassociation entailing great labor cost and consuming substantially greater periods of time which results in material delays.

Since cutting and hay gathering operations where these implements are principally employed are ofttimes required to be executed during critically brief seasonal intervals, such delay factors may result in major crop losses as where late fall rains and frost are likely to occur before the hay cutting and gathering can be completed. It is therefore to be recognized of major importance that the quick dismantling feature of the present invention, as will be explained hereinafter, whereby pulley belt replacements may be accomplished in comparatively short order, constitutes a material advantage that may make the difference between profitable farming or loss.

Mowing implements of this class are such as utilize a pair of laterally exposed interengaging bars which are formed with double edged serrations or cutting teeth that intersect each other when the bars are longitudinally shifted, one with respect to the other. These cutting teeth require to be placed at a relatively low land clearing position in order to perform their operation efficiently and whereby to reduce loss as through excessive stubble. In keeping with these practices, it must be recognized also that there is incurred at the same time a greater risk of damage through encounter with foreign objects such as stones, roots, etc. which are injurious to the sharp cutting edges and which hazard the safety of the operator because of their likelihood of causing disruption. These hazards have been recognized by others and various modes of mechanical yielding devices have been employed heretofore whereby the cutting blades are permitted to become disconnected from the power train and at the same time to be swung yieldably backwards whereby to submit to the obstructing cause. Where these results have been accomplished, the attainment of a precise condition of collapsability or yield has proved difficult to be maintained due to various causes such as corrosion and adjustment failures. Also, where power disconnection has taken the form of a permanent separation, restoration has been noted to require dismounting by the operator and subsequent attention consuming an inordinately large loss of time.

By means of the present invention, the problem of obstruction encounter has been solved by the provision of a simplified yet rugged disconnect linkage effectively immune to the ravages of corrosion which result in coupling failure. Also, there has been devised a power coupling system which is maintained even during cutting blade disassociation or yield. At the same time, the continued operation is made relatively safe by reason of geometric change in the effective amplitude of a power crank. Thus while power train connection is maintained whereby reinstatement of normal operations requires only a backup of the tractor to effect restoration, the cutting action in the blade is so minimized as to amount to dormancy in respect to blade action and such level of safety as compares with those devices where permanent disjuncture is effected.

A principal object of the present invention is to provide a tractable power take-off driven mowing implement suitable for general farm requirements which possesses inherent in its design attachment flexibility which makes it suitable for use with known classes of commercial tractors.

Another object of the present invention is to devise a tractable power driven mowing machine which possesses minimum longitudinal proportions within a given range of mowing capacity and cutting displacement.

A further object of the present invention is to devise a powered farm implement for mowing which possesses a full complement of safety features while yet admitting of facile field repair and adjustment.

An additional object of the present invention is to devise a farm implement for mowing standing crops characterized by longitudinal flexibility in its framework and power distribution whereby to permit close conformation to land surface and contour.

With these and other objects in view which will become more evident during the course of the following detailed specification and which may be noted from the objectivity of the hereinafter attached claims, reference will now be made to the accompanying drawings wherein similar reference marks designate corresponding parts throughout and wherein:

Fig. 1 is a plan view of a tractable farm mower attached to a four-wheeled tractor implement of conventional design showing the mowing blades in active and disengaged positions;

Fig. 2 is an enlarged plan view of a portion of the mowing implement illustrated in Fig. 1 featuring the pivotable main beam and distendable latch linkage therefor;

Fig. 3 is an enlarged fragmentary rear elevational view with parts broken away and shown in section of a tractable mowing machine which embodies various features of the present invention;

Fig. 4 is an enlarged plan view similar to Fig. 2, but with parts broken away and shown in section, showing the main beam and distendable linkage in latching or effective operating condition;

Fig. 5 is a perspective detail view of the vertically pivotable main beam and its integrally associated bracket elements which support the mowing blade assembly and the swingable power transmission linkage;

Fig. 6 is a fragmentary side elevational view with parts broken away and shown in section of a frontal hitch beam and universal joint articulated power shaft generally parallel thereto featuring an interconnected strap and fixture bracket association therebetween in one form of engagement;

Fig. 7 is a rear elevational view of a portion of the machine as viewed in Fig. 3 showing the cutter blades suspended in an inactive or poised condition as when the implement is drawn idly towards or away from its field of activity;

Fig. 8 is an enlarged transverse sectional view taken approximately on line 8—8 of Fig. 3;

Fig. 9 is an enlarged fragmentary sectional view taken approximately on line 9—9 of Fig. 8;

Fig. 10 is an enlarged detail sectional view taken approximately on line 10—10 of Fig. 14;

Fig. 11 is a transverse sectional view observed in a reverse direction from Fig. 10 as indicated on line 11—11 of Fig. 14;

Fig. 12 is a fragmentary perspective view of a portion of the power transmission system and main framework local to the frictionally yieldable belt drive featuring a partially dismantled condition to show the facility with which a replacement belt may be installed;

Fig. 13 is a perspective view of a transmission case bearing bracket and its flexible coupling extension;

Fig. 14 is an enlarged side elevational view with portions in section taken approximately on line 14—14 of Fig. 3;

Fig. 14a is a perspective view of one of the obtuse angled tooth clutch elements associated with the uppermost pulley wheel;

Fig. 14b is a sectional view taken approximately on 14b—14b of Fig. 14;

Fig. 15 is a fragmentary side elevational view of a reversible coupling bracket featured in Fig. 6 showing an alternative condition of assembly to a tractor implement which is characterized by a greater distance between its draft coupling and its power take-off stub than that contemplated in Fig. 6;

Fig. 16 is a perspective view of the bracket element whose reversibility is featured in Figs. 6 and 15;

Fig. 17 is a sectional detail view taken approximately on lines 17—17 of Fig. 6;

Fig. 18 is an enlarged sectional detail view taken approximately on line 18—18 of Fig. 14;

Fig. 19 is an enlarged sectional detail view taken approximately on line 19—19 of Fig. 6;

Fig. 20 is a side elevational view on a reduced scale of the principal implement featured in Figs. 1, 2 and 3 with the right side wheel indicated in dotted outline to reveal its forward displacement with respect to its companion wheel;

Fig. 21 is an enlarged longitudinal sectional view taken approximately on line 21—21 of Fig. 4 showing the various elements of the distendable linkage in section;

Fig. 22 is an enlarged transverse sectional view taken approximately on line 22—22 of Fig. 21;

Fig. 23 is an enlarged transverse sectional view taken approximately on line 23—23 of Fig. 21;

Fig. 24 is an enlarged transverse sectional view taken approximately on line 24—24 of Fig. 3;

Fig. 25 is a transverse longitudinal sectional view similar to Fig. 21 of a portion of the yieldable coupling apparatus thereof;

Fig. 26 is an enlarged sectional detail view taken approximately on line 26—26 of Fig. 28;

Fig. 27 is a perspective view of a journal bracket carried by the skid casting yoke;

Fig. 28 is an enlarged sectional detail view taken approximately on line 28—28 of Fig. 26; and Figs. 29 through 31 are diminutive side elevational views illustrating variable coupling adjustments as well as longitudinal main frame and drive shaft flexibility whereby the mower implement lends itself to a wide variety of tractor installations and to close surface contour adherence.

In the mower apparatus illustrated in the accompanying drawings, a principal framework consists of an obliquely disposed axle beam 41, Figs. 1, 2 and 14, preferably of square tubular cross section to which is welded as indicated at 42 in Fig. 14 a longitudinally extending draft bar 43. The axle beam 41 carries at its extremities a pair of axle brackets designated 44 and 45, each welded to its respective beam end whereby it is disposed downwardly and outwardly in its right angular formation carrying, on its horizontal length which serves as a journal, one of the roller wheels 46 or 47. By reason of the obliquity of beam 41, the wheels 46 and 47, though disposed to track in a forward direction with the mower vehicle, are angularly displaced one from the other as best seen in Fig. 1.

Two advantages are consequent of this arrangement. Functionally this unusual arrangement of trailer wheels favors a sharper turning radius and tracking alignment in a rightward direction which is customarily the turning practice of American farmers in harvesting feed crops by mower implement. An additional advantage which is achieved by this relative wheel displacement is in the foreshortening of the implement length because of the forward disposition of wheel 47 which makes possible a closer or more compact placement of the cutter blade generally designated 48.

At the rear of the draft bar 43, where it joins the axle beam 42, there is provided an overlying channel strut 49, the forward end of which is welded as at 51 to a forward sheet metal protective housing 52 that encompasses the lowermost adjustable pulley wheel 53 of a V-belt transmission system. The rear end of the channel strut 49 is also welded on a stepped junction line 54 at which it intersects the protective housing 55 that encompasses a fly wheel crank arm 56, Fig. 9, as will be later explained, and converts the rotary motion received from the power take-off to reciprocal motion for actuating the cutter blade 48. A torque tube 57 also welded to the encompassing housing 52 and 55 as at 58 and 59 (see also Fig. 8) additionally rigidifies the two structures giving to the welded assembly, which includes strut beam 49 and the two housings 52 and 55, ample ruggedness so as to withstand the rigors of vibration which are incident to the crank action as well as the stresses which are set up by normal usage during mowing or extraordinary conditions during encounter with obstructions.

The oblique angle of beam 41 is additionally reenforced by a pair of angle iron strut beams 61 and 62, Fig. 3, 4 and 14, which are welded to the principal panel of housing 55. Draft bar 43 extends in a forward direction and is designed to slope downwardly at a slight angle when coupled through its clevis tongues 63 with a coupling ear 64 to which it is pivotally articulated as by a clevis pin 65. Beam 43 near its upward extremity is provided with a pair of vertically traversing apertures of predetermined space relationship so as to receive the mounting bolts 66 therethrough for anchoring a reversible bracket 67 either in the position indicated in Fig. 6 with its side flanges downwardly or as indicated in Fig. 15 with its side flanges directed upwardly.

The side flanges of bracket 67 are significantly spaced each from the other so as to straddle between them the draft bar 43 when placed in the position shown in Fig. 6. The plurality of transversely aligned openings 68 together with the reversibility of the bracket 67 affords a wide range of vertical adjustability at which to dispose a pair of spacer links 69 which are bolted as at 71 in the trunnion extremities of a collar 72, Fig. 6, as well as at 73 to a suitable alignment of the openings 68 and the side members of bracket 67. This precise adjustability may be more accurately regulated by providing in the strap links 69 a series of openings as at 74 to receive the anchor bolts 73.

The establishment of the space relationship between draft bar 43 and the drive shaft, which will later be described, connecting the power take-off to the mower cutters is a feature of profound importance to a mowing machine since it permits of the maintenance of linear flexibility to a degree that is important to close contour adherence of the cutting mower, especially where the earth's surface is irregular or rolling.

It also affords an adaptability to different commercial tractors wherein the spacing between the draft attachment ear 64 and a power stub shaft 75 is at considerable variance. Thus it is to be observed that by means of the versatility of bracket 67 coupled with the extensive adjustability of link straps 69, there is accomplished a maximum of adjustment in a vertical sense without having to provide a single rigid piece part or other element of comparable length.

Adjustment for relative differences between the locations of ear 64 and driving stub 75 in a horizontal sense is achieved by means of the slidable torque shaft collar 76 integral with the torque tube 77 which is provided with a square internal bore conforming with dimensions of the shaft extremity 78. A limit pin 79 prevents the collar 76 from being extended beyond the length of extremity 78. Encounter of the collar 76 with limit pin 79 has been designed to correspond with maximum requirements under prevailing ranges in tractor design. As the drive shaft is thus susceptible to elongation, so too the protective cover sleeve 81 is longitudinally slidable over its internal companion 82 carrying with it the hood 83 which tapers outwardly and is open at the bottom so as to conform with the larger diameter of canopy 84, to which it is yieldably connected by a spring loaded tie pin 85 which passes through the elongated slots 86 in both the hood 83 and canopy 84. A similar tie pin 87 at the foreportion of canopy 84 permits longitudinal movement between canopy 84 and similar member 85 when such is provided in accordance with commercial tractor structures, to protect the stub shaft 75.

The yieldability at the junctures which is afforded by the elastic tie pins 85 and 87 prevails at all times and gives to the protective elements a slight but adequate sinuous flexure in correspondence with the bending or pivoting of the drive shaft components afforded by the universal knuckles 88 and 89. The just described flexibility characteristics are creditable with the accomplishment of sufficient longitudinal flexing in the drive shaft to permit the trailing vehicle or mower to maintain faithful adherence to the contour of the earth's surface when such contour varies, as shown for example, by the condition in Fig. 31 or such as may be indicated by other variations.

It has been stated that link straps 69 are articulated at their extremity to the trunnion bolts 71 as well as to bolts 73. This is for the purpose of permitting longitudinal conformation to suit a particular installation while yet maintaining firm and rugged the strut support between the drive shaft and the draft bar 43. In furtherance of this purpose, collar 72 is made to encompass a journal portion of the shaft stub 91 which immediately precedes the universal knuckle or joint 88. By having this journal portion reduced to confine it within collar 72, links 69 being rotatable about pivot 73, there is achieved linear displaceability in the drive shaft without sacrifice to any degree compactness or overall dimension once established between the drive shaft and the draft tongue.

The hood 83 which is illustrated as welded to the outer sleeve 81 as well as canopy 84, may be maintained securely in an overlying and erect position by providing a support yoke 92 bolted as at 93 to the largest diameter portion of hood 83 and journaled at its ends in the trunnion bolts 71. Thereby is accomplished a full protective covering to a flexible drive shaft open at critical areas for accessibility as needed during periodic servicing and yet constituting a full shelter against infiltration and invasion by foreign matter, precipitation or other deleterious effects.

Where the internal sleeve 82 of the cylindrical enclosure portion couples to the journal casting 94, see also Fig. 13, longitudinal flexibility is afforded through the means of a spring loaded anchor pin 95 resembling pins 85 and 87 whose head passes through an elongated slot 96 in a peripheral bracket strap welded as at 97 to the journal tubing 94. The head of pin 95 is inserted through the slot 96 whereafter it passes through a friction plate 97' integral with sleeve 82 and is pinned with its coil spring under compression urging against an outermost bracket element 98 placed there for the purpose of distributing the spring pressure to a larger area of the sheet metal tube 82. This flexibility is hereat located to accord with an additional universal coupling 99 in the succession of elements which constitutes the drive shaft whereby yield and resiliency is carried through to further augment the already discussed primary theme of close contour responsiveness on the part of the herein described implement.

Where the driven portion of universal knuckle 99 connects with a firmly journaled stub shaft 101, a suitable device of splined fitting 102 is preferably provided so that the drive shaft as well as its protective casements may be disconnected at this point to serve the ends of ready accessibility for field repairs and seasonal dismantling.

The firmly journaled shaft portion 101 is provided with roller bearing raceways as at 103 and 104 of which the outermost race rings may be drive fitted into a machined tube 94. The latter member is provided with outwardly extending flanges 105 and 106, see Fig. 13, apertured to receive the mount bolts 107 whereby the journal tube 94 is made perpendicular to the enclosure case 108 that peripherally encompasses the spring loaded drive pulley 109, Figs. 10 and 14. The casing element 108 is formed with a downwardly extending skirt 111 in which is formed an aperture 112, Figs. 10 and 11, and at its lowermost extremity is welded as at 113 to a short length of securement channel 114 dimensioned to straddle the draft bar tube 43 and be bolted as at 115 within an adjustable longitudinal range thereto in accordance with the accommodations afforded by the elongated openings 116 in the latter, Fig. 14.

The aforedescribed securements of protective casing 108 to the journal sleeve 94 as well as to the draft bar 43 gives to this member a quality of sturdiness and rigidity which it requires to withstand vibration while yet permitting its complete removal when there is required to be installed a replacement drive belt 117 into the pulley transmission system involving pulley wheels 53 and 109.

The removal of a worn belt and the reinstatement of a replacement belt is accomplished by threading it over the end of the draft bar 43 until the belt arrives in the region of the transmission elements, see for example Fig. 12. Thereafter, by removing the bolts 107 and 115, an upper end of the belt may be carried over the pulley wheel 109 as the lower end is placed around wheel 53. When the belt 117 has been properly seated, the bolts 115 are restored and thereafter by lifting the journal sleeve 94 to its normal distance perpendicularly away from driven shaft 118, the requisite driving tension in the belt 117 may be established after which the bolts 107 are tightened as the thrust spring 119 of the yieldable pulley wheel 109 is readjusted to establish suitable tension.

It will be observed that both pulleys 53 and 109 are made adjustable as regards their sheave components. Thus wheel 53 comprises a sheave component 121 which is slotted to receive a shaft spline as at 122 and provided with a collar 123 on which is slidable the other component 124. The two components are held together by a series of circularly disposed bolts 125 and the adjustment is relatively stable and determinable by the number of shims 126 that are placed between the components. The collar 123 is held on sheave 118 by a castellated nut 127.

The driving pulley 109 is similarly constituted of two component elements of which one designated 131 is provided with a collar 132 carried on stub shaft 101. The other component element 137, which consists principally of a dished flange ring, is bolted to member 131 by three circumferentially spaced bolts 133 in accordance with a spacing determined by the shims 134.

Power is transmitted through the stub shaft 101 which is provided with an integral flange 138 to a clutch element 139, see also Fig. 14a, that has on its rear surface a number of pins 141 that fit into notches of the flange disc 138. Ring 139 constitutes the driving member of a clutch coupling, and its coupling face is provided with a radial distribution of shallow V-shaped coupling teeth 142 similar to and nesting with the coupling teeth of a companion ring 143 whose setting pins, similar to those designated 141 of ring 139, are received in apparatus 136 of pulley component 131.

A coiled tensioning spring 119 which may be adjusted in accordance with the regulation afforded by a pair of check nuts 144 on the threaded end of shaft 101 urges against thrust washer 145 whereby to determine the pressure engagement between the two coupling elements 139 and 143. When a sufficient resistance to the power communicated by shaft 101 is encountered to permit the shallow V-teeth 143 to cam spring 119 into compression, there will follow a succession of slip motions with the driven element 143 of the clutch pair alternately compressing and returning with the tension of spring 119.

In the absence of overpowering resistance the rotary motion of drive sheave 109 is communicated through belt 117 to the driven sheave 53 and thence to the stud shaft 118, which, as best indicated in Figs. 8 and 14, carries at its inner end the fly wheel 56 which functions also as a crank arm and carries a crank pin 148, see also Fig. 3.

Crank pin 148, which may be an integral part of fly wheel 56, is a short stud element providing a rotary journal surface for a yoke 149 which carries a pair of axially aligned oppositely extending trunnion pins 151, Fig. 8. These pass through the spaced arms of a forked element 152, see also Fig. 3, located on one end of pitman rod 153, whose other end 154, Fig. 26, is flexibly coupled to an upstanding pin 155 integral with the reciprocating shear blade 156, companion to the relatively inert cutter blade 48 already described.

The coupling which has just been described consists of a pair of pressure adjustable arms having at their extremities concave recesses suited to receive the spherical enlargement 157 on the end of pin 155 and adjustable by means of the bolt 158 for tensioning purposes as well as for disconnection of other purposes.

When the mower, which includes blades 48 and 156, is in its operative or utility position such as is shown in solid outline in Fig. 1 and such as is indicated in dotted outline in Fig. 2, the crank action of crank pin 148 is effective to transmit the full amplitude of its eccentric motion to the reciprocable blade 156, and under such circumstances the teeth of said blade will travel to and fro, intercepting the teeth of blade 48 to the extent or distance corresponding at least to the distance between two adjacent teeth. This can be understood better by observing the tooth structure details illustrated in solid outline in Fig. 2. The mower blade assembly is maintained in its effective position subject to an overpowering encounter because of the detent mechanism illustrated in Fig. 25. This will now be more intimately revealed. The non-reciprocating blade 48 is welded as at 161 to a cradle member 162, see also Fig. 28. The latter member is formed with a pair of journal ears 163 for receiving one arm 164 of a yoke 165 and a corresponding pair of ears 166 at the other end for similarly receiving another arm 167 of yoke 165. Also member 162 is shaped to receive the mount elements 168 and 169 of a skid 171 which is adapted to glide over the surface of the soil and to give springable support to the assembly which hinges from the yoke member 165.

The other end of the cutter blade assembly also terminates with a skid element 172, so that when the machine is in operative position the two skids 171 and 172 provide lateral support to both ends of the blade assembly, and when elevated the two skids assume the position illustrated in Fig. 7.

By referring to Fig. 2, it will be noted that yoke 165 is reinforced with a sidewardly extending gusset 173 to which is welded a beam 174, see also Fig. 3, which is securely integrated as at 175 to a pivotable post 176, and that it also passes between the arms 177 and 178 if a support bracket welded as at 179 to a swingable boom 181 that extends outwardly from and is preferably welded to the pivotal post 176.

From the foregoing it will be understood that yoke 165 is securely carried by beam 174 and that the entire assembly is pivotable around the post 176 as a vertical axis.

Near its upper end post 176 also mounts a rotatable sheave wheel 182, and around this wheel there are guided the links of a control element, a portion of which is made of chain 183, as best indicated in Fig. 2, and other portions of which include a rod member 184 and another rod member 185. Rod member 184 passes through the aperture 112 in the wall of casing 111 and is articulated as at 186 to an arm 187, pivotably mounted as at 188, see also Fig. 4.

When it is desired to elevate the cutter blade assembly from its horizontal position resting on its skids 171 and 172 to its elevated position as shown in Fig. 7, an operator may, by pulling the control lever 189 forward, rock arm 187 in the same direction and exert a pull on the rod and chain links 184, 183, and 185, whereupon he will cause to be rotated a bell crank 191 about pivot 192, Fig. 7, lifting the link 193 and rotating bell crank member 194 clockwise about pivot 195. As a consequence, link 196 will rotate arm 197 counterclockwise, as viewed in Fig. 7, about pivot 198 and this will rock the entire bracket 162 about both of its pivots 198 and 199, which are in axial alignment. In order to maintain the poised position of the cutter blade lifting mechanism just described, a detent pin 201, Fig. 14, is provided having an extremity that is detentably engaged in the notches 202 of a latching segment 203.

Attention is now directed to Figs. 2 and 4, where it will be observed that beam 174 carries welded to it and nearest to outermost or free extremity a yoke strap 204, see also Fig. 21. The ends of this strap afford journal support to a short vertical pin 205 which constitutes a pivot for the cantilever arm 206. Arm 206 has an upper surface which is serrated as at 207, as is also the under surface of a channel beam 208. By means of the bolts 209, beam 208 may be adjustably positioned with respect to arm 206, whereby to afford a device for varying the length of the total supporting link which includes, in addition to the already described arm 206 and channel 208, a beam 211 having an end bracket 212. Bracket 212 is a universal engaging claw which receives the sphere 210 as an anchor and swivel carried between ledge 200 of the main frame.

When in the condition shown in Fig. 21, which is characterized by the full insertion of beam 211 within the channel 208 a detent forging 213 which has an underhang insert 214 passing through an aperture in the top wall of beam 211 engages with its hooked section 215, a traverse pin 216 that constitutes a latch pin carried by a bracket member 217 welded to beam 208. This engagement is yieldably maintained by the pressure of a compression spring 218 carried on a guide bolt 219 whose head also passes through the top wall of beam 211. When an obstruction such as that indicated 221 in Fig. 1 is encountered by the cutter bar assembly as the tractor 222 seeks to pull this implement forward, a force is exerted upon the link featured in Fig. 21, tending to draw beam 211 out of its companion and surrounding beam 208. When this force is great enough to overcome the detent action of spring 218, latch 213 releases and permits the linkage to become elongated after the manner shown in solid outline in Fig. 2. When the obstruction has been removed and the tractor backed up or the cutter blade swung forward, latch pin 216 may be forced to engage the camming surface 223, whereupon the spring 218 will again be overpowered sufficiently to permit the reengagement of pin 216 with its recess in portion 215. This operation is illustrated in the relationship of the elements shown in Fig. 25.

The innermost end of beam 211 is provided with a rectangular encircling or ring member 224 which is welded to the channel 211 as at 225, but which encompasses the larger channel member 208. This ring 224 serves to steady the rear end of beam 211 as well as to be damped against vibration when it engages the pressure spring 226 as best illustrated in Fig. 21.

Attention is now directed to the fact that in the foregoing disclosed apparatus there is featured an instantly detachable coupling for pull-behind farm mowers which may be made adjustably yieldable to various degrees of obstacle encounter but which nevertheless maintains a permanent driving connection with its cutter blade even during the uncoupled condition such as that shown in Fig. 2. In lieu of disconnection of the power train however, the reciprocal movement which is imparted to the cutter blade 156 becomes reduced in its length of structure to an insignificant short motion by reason of the fact that the crank pin 148 becomes disposed to describe its circular throw in a direction which becomes perpendicular to the pitman 174. Upon reinstatement to normal operative condition all that is required to be done is the relatching of member 213 with its latch pin 216, whereupon the normal throw or movement of the cutter blade is without further attention fully restored.

While the present invention has been explained and described with reference to a particular embodiment of structure, it is understood nevertheless that numerous modifications and variations are capable of being incorporated without departing from the essential spirit or scope thereof. Accordingly, it is not intended for an understanding of the principles of this invention to be limited to the particular structure shown in the accompanying drawings nor to the language employed in the foregoing description except as indicated in the herein appended claims.

The invention claimed is:

1. An implement-carrying device adapted for connection to a tractor having a power take-off and comprising a longitudinal draft beam adapted to be disposed at the rear of the tractor and to extend generally longitudinally rearwardly thereof, means affording an articulated connection between said beam and said tractor, an axle beam having a ground-engaging wheel at each end and secured to said draft beam in angular relation thereto so that said wheels are disposed in parallelism for forward motion but are axially displaced one rearwardly of the other, a transverse beam pivotally connected substantially to the rearward end of said longitudinal beam and extending sideways thereof and rearwardly of the foremost of said wheels, a cutting mechanism pivotally supported on the free end of said transverse beam, means affording a driving connection between said power take-off and said cutting mechanism, said transverse beam being adapted to swing rearwardly upon said cutting mechanism engaging an obstruction in its path of travel.

2. An implement-carrying device adapted for pull-behind connection to a tractor having a power take-off and a draft connection below said power take-off, said implement including a longitudinal draft beam having means for coupling the same to the draft connection of the tractor, an axle beam extending transversely of said draft beam and having a ground-engaging wheel at each end, an articulated jointed power take-off drive shaft connected to said power take-off and disposed above said draft beam, a collar having trunnion extremities and journaled on said shaft in close proximity to a joint thereof, a strap depending from each trunnion extremity and having a series of longitudinally spaced apertures, a substantially U-shaped bracket adapted for reversible mounting on said draft beam to afford an increased range of adjustability, said bracket having in each leg thereof a series of apertures adapted to cooperate with the apertures of said straps to receive means adapted to pass through registering apertures to secure said straps to said bracket in a position of relative adjustment.

References Cited in the file of this patent

UNITED STATES PATENTS

| | | |
|---|---|---|
| 1,899,329 | Horste | Feb. 28, 1933 |
| 2,000,363 | Thoen | May 7, 1935 |
| 2,314,215 | Hilblom | Mar. 16, 1943 |
| 2,349,923 | Anderson et al. | May 30, 1944 |
| 2,429,492 | Scranton | Oct. 21, 1947 |
| 2,430,143 | Rutter | Nov. 4, 1947 |
| 2,490,894 | Zink et al. | Dec. 13, 1949 |
| 2,514,089 | Punsky | July 4, 1950 |
| 2,594,426 | Grenda | Apr. 29, 1952 |
| 2,614,405 | Clausen | Oct. 21, 1952 |
| 2,696,089 | Heth | Dec. 7, 1954 |